United States Patent
Burke et al.

(10) Patent No.: US 6,578,683 B1
(45) Date of Patent: Jun. 17, 2003

(54) MINIATURE RETRACTABLE CORD REEL

(75) Inventors: Paul C. Burke, Lake Forest, IL (US); Richard E. Skowronski, North Hampton, NH (US)

(73) Assignee: Telefonix, Inc, Waukegan, IL (US)

( * ) Notice: Subject to any disclaimer, the term of this patent is extended or adjusted under 35 U.S.C. 154(b) by 0 days.

(21) Appl. No.: 09/856,214
(22) PCT Filed: Nov. 12, 1999
(86) PCT No.: PCT/US99/26711
§ 371 (c)(1), (2), (4) Date: Sep. 24, 2001
(87) PCT Pub. No.: WO00/31847
PCT Pub. Date: Jun. 2, 2000

(51) Int. Cl.[7] ............................. H02G 11/02
(52) U.S. Cl. .................... 191/12.4; 191/12 R
(58) Field of Search ............ 191/12 R, 12.4, 191/12.2 R; 379/437, 438; 242/378.4, 378

(56) References Cited

U.S. PATENT DOCUMENTS

| | | | |
|---|---|---|---|
| 1,442,999 A | | 1/1923 | Boyle |
| 1,958,626 A | | 5/1934 | Krantz |
| 2,751,565 A | | 6/1956 | Johnson |
| 2,821,453 A | | 1/1958 | Jessen |
| 2,937,396 A | | 5/1960 | Momberg et al. |
| 3,657,491 A | | 4/1972 | Ryder et al. |
| 3,705,962 A | | 12/1972 | Banister |
| 3,773,987 A | | 11/1973 | Davis et al. |
| 4,053,118 A | | 10/1977 | Atkins |
| 4,134,953 A | * | 1/1979 | Dembiak et al. ............ 156/54 |
| 4,150,798 A | | 4/1979 | Aragon |
| 4,151,365 A | * | 4/1979 | Hacker ............ 156/54 |
| 4,384,688 A | | 5/1983 | Smith |
| 4,485,278 A | | 11/1984 | Schaller et al. |
| 4,499,341 A | | 2/1985 | Boyd |
| 4,517,757 A | | 5/1985 | Asada et al. |
| 4,756,087 A | * | 7/1988 | Sing ............ 242/384.7 |
| 4,757,955 A | * | 7/1988 | Simmons ............ 191/12.2 R |
| 4,989,805 A | | 2/1991 | Burke |
| 5,094,396 A | | 3/1992 | Burke |
| 5,155,766 A | * | 10/1992 | Skowronski ............ 379/438 |
| 5,332,171 A | | 7/1994 | Steff |
| 5,535,960 A | | 7/1996 | Skowronski et al. |
| 5,581,821 A | * | 12/1996 | Nakano ............ 2/422 |
| 5,590,749 A | * | 1/1997 | Wagner et al. ............ 191/12.4 |
| 5,655,143 A | | 8/1997 | Alpert et al. |
| 5,701,981 A | | 12/1997 | Marshall et al. |
| 5,718,310 A | | 2/1998 | Gallo |

FOREIGN PATENT DOCUMENTS

| | | |
|---|---|---|
| DE | 3518157 | 11/1986 |
| JP | 9054882 | 2/1997 |
| TW | 343012 | 10/1998 |
| TW | 86216544 | 10/1998 |
| TW | 344922 | 11/1998 |
| TW | 86111755 | 11/1998 |

* cited by examiner

Primary Examiner—S. Joseph Morano
Assistant Examiner—Frantz F. Jules
(74) Attorney, Agent, or Firm—Grossman & Flight, LLC

(57) ABSTRACT

A cord reel device (1) for connecting a signal source (A) to a remote device (B, C) comprises a spool (2) rotatable on an arbor (18), the spool (2) having an inner chamber (6) and an outer trough (8). A retractable cord (10) is removably held in the trough (8). A spring (220) for urging the rotation of the spool (2) in a direction to retract the cord (10) is held in the inner chamber (6). The inner cable (24) is electrically connected to the retractable cord (10). The cord reel (1) of the invention may preferably include EMI-RFI shielding (112), and may find particular utility in applications requiring a substantially miniature cord reel, such as with a cellular telephone or the like.

20 Claims, 2 Drawing Sheets

MINIATURE RETRACTABLE CORD REEL

FIELD OF THE INVENTION OF THE INVENTION

The present invention relates to retractable cord reel devices. In particular, the present invention relates to retractable cord reel devices of a small size suitable for use with hand held electronic devices such as cellular telephones and the like.

BACKGROUND OF THE INVENTION

Retractable cord reel devices may be used to dispense and automatically recall cords that connect one component of an apparatus to another. The connection may be electronic, as in the case of a small cellular telephone, for instance, where a retractable cord reel may be used to connect a microphone and ear piece or headphone to the base telephone unit.

Most cord reels comprise a rotating spool on which a retractable cord is held. Some prior art devices provide rotating electrical contacts between the spool and the spool housing or base member. In electronic applications, particularly those involving low current signals, moving contacts can cause static and other undesirable signal disruptions. Further, contacts systems are not very durable—the quality of the electrical contact deteriorating with wear.

One solution to rotating contacts is to provide a second cable, typically flat, within the cord reel that expands and contracts as the retractable cord is retracted and returned. See, for example, U.S. Pat. No. 5,094,396 to Paul C. Burke. However, cord reels of this type may be too large for use with small electronic devices, such as cellular telephones. Specifically, the reel disclosed in the Burke '396 patent has multiple compartments for the retractable cord, expandable cable, spring and ratchet. As a result the housing is relatively large, and would not be suitable for incorporation into a small electronic device such as a cell phone.

Also, many prior art designs do not adequately address the significant stress that is put on the moving parts of such small reels. As a telephone ear piece is pulled by hand from a telephone, a great deal of stress may result. Over repeated uses this stress often results in failure of an electrical connection or mechanical failures for the small gage cables (e.g., Litz wire) and other parts used in prior art reel devices. Larger, more durable cables are not practical because of the required small reel size, and because of the need for a lightweight, flexible cord for use with an earphone and/or microphone.

Also, many prior art cord reel devices suitable for use with small applications do not provide for adequate shielding of electrical signals from interference. This problem is particularly acute for small telephones and the like using a microphone and earphone of a very low voltage. Inadequate shielding results in cross talk and other electronic noise. The small gage cables, small cable reels, and small cable housings of many prior art designs sacrifice adequate shielding for compact size.

There is therefore an unresolved need for a cord reel device that is compatible with the particular challenges presented by use with small electronic devices such as cellular phones and the like.

OBJECTS OF THE INVENTION

It is an object of the invention to provide a cord reel device of a compact design.

It is a further object of the invention to provide a durable cord reel device having improved resistance to stress related fatigue failures.

It is a still further object of the invention to provide a cord reel device having effective shielding to electrical interference.

SUMMARY OF THE INVENTION

The retractable cord reel of the present invention generally comprises a housing or base plate supporting an arbor, a spool rotatably mounted on the arbor, a retractable cord held on the spool, and a device for rotating the spool to retract the cord. The spool has an annular wall which defines an inner chamber and an outer trough. The retractable cord is held within the spool outer trough. A first end of the retractable cord is adjacent to the annular wall, and the other end retractably extends outwardly from the spool. The retraction device preferably comprises a spring that is helically wound in the spool inner chamber. An inner cable is also contained in the spool inner chamber, helically wound with the spring. The inner cable has one end conductively connected to the retractable cord, and a second end is stationary at the center of the spool.

A preferred embodiment of the present invention is useful to connect a cellular telephone base unit or source to a remote device such as a ear piece and microphone. In this embodiment, the telephone base unit provides a housing for the cord reel of the invention. The arbor is mounted to the housing or on a base plate contained within the housing. The spool is rotatably mounted on the arbor. The housing includes a radial opening through which an end of the retractable cord can pass. A ratchet mechanism may also be held in the housing or base plate to selectively restrain rotation of the spool. Although desirable, a ratchet is not strictly required.

The retractable cord comprises a plurality of conductors, at least one of the conductors, e.g., the mic conductor, is surrounded by an electromagnetic shield. The plural conductors are in turn covered by a reinforcing fabric layer. The reinforced fabric, preferably nylon braid, is mechanically attached to the spool, thereby providing a secure attachment that relieves the inner conductors from mechanical stress. A small gage conductor, such as Litz wire, can therefore be used without undue risk of failure. Accordingly, the retractable cord has desirable qualities including a small diameter, good flexibility, light weight, and good tensile strength.

The spring is preferably connected at a first end to the arbor, and at a second end to the spool, such as the annular wall separating the inner chamber from the outer trough. The spring is wound so that it builds and stores energy when the retractable cord is retracted from the spool. Upon release of the cord, the spring rotates the spool in a cord retracting direction.

An inner cable is helically wound with the spring in the inner chamber of the preferred cord reel embodiment of the invention. The preferred inner cable comprises one or more conductors electrically connecting a source, such as the telephone base unit, to the conductors of the retractable cord. The source is directly connected to the retractable cord, thereby avoiding intermittent disruption of signal that may result from moving contacts as utilized in the prior art. Winding the inner cable with the spring eliminates the need for a separate chamber or other additional space. The inner cable may comprise a flat ribbon cable, a strip conductor, individual conductors, or other configurations. The inner cable may be attached to the spring, or it may be separately wound with the spring. In any event, the conductors of the inner cable are insulated from the spring.

A preferred inner cable comprises a plurality of conductors carried on the spring having insulating layer(s) between the spring and the conductors. The inner cable conductors preferably comprise thin conductive strips, such as metal strips. The conductive strips may be thin metal foils, or can be formed by painting or printing conductive material onto a plastic or other insulating layer. The sub-assembly of the conductors, insulating layers and spring may be constructed in several ways. For example, plural, spaced apart, conductive strips may be sandwiched between two layers of an insulating material, such as mylar, and then adhered to the spring. An alternative construction comprises, a layer of insulating material adhered to the spring, plural spaced conductors adhered over the insulating layer, and an insulating coating applied over the top of the conductors. A third example comprises a layer of insulating material adhered to the spring, plural spaced conductors adhered over the insulating layer, and an insulating coating applied to the bottom surface of the spring. Other ways of insulating the conductors from the spring will be apparent to persons skilled in the art.

The spool and/or the housing and base plate of the preferred cord reel embodiment of the invention is shielded. The shield is preferably a nickel plating or coating, providing an electromagnetic/radio frequency interference ("EMI-RFI") shield. As described above, the retractable cord likewise has a shielding layer around at least one conductor. The inner cable, however, is not required to have individual shielding as it is contained in the inner chamber and thus shielded by the metal spring, and the plating layers of the spool walls and/or the housing and base plate.

The overall result of the space savings realized by the compact retractable cord, the inner cable, and other compact elements of the configuration of the spool of the invention allow for a most advantageous compact spool size. The preferred spool has a diameter of less than 4 cm (1½ inch), and a thickness of less than about 2 cm (¾ inch), and most preferably less than 1 cm (⅜ inch).

The above brief description sets forth rather broadly the more important features of the present disclosure so that the detailed description that follows may be better understood, and so that the present contributions to the art may be better appreciated. There are, of course, additional features of the disclosure that will be described hereinafter which will form the subject matter of the claims appended hereto. In this respect, before explaining the several embodiments of the disclosure in detail, it is to be understood that the disclosure is not limited in its application to the details of the construction and the arrangements set forth in the following description or illustrated in the drawings. The present invention is capable of other embodiments and of being practiced and carried out in various ways, as will be appreciated by those skilled in the art. Also, it is to be understood that the phraseology and terminology employed herein are for description and not limitation.

DETAILED DESCRIPTION

Figure 1:
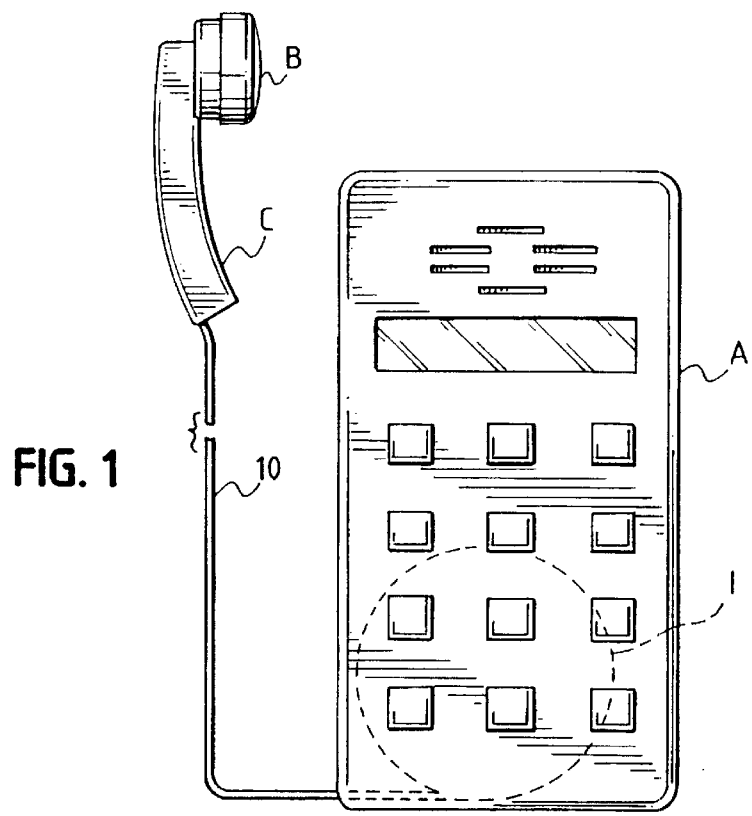
FIG. 1 is plan view of a cellular telephone and a combination ear piece and microphone.
Figure 6:
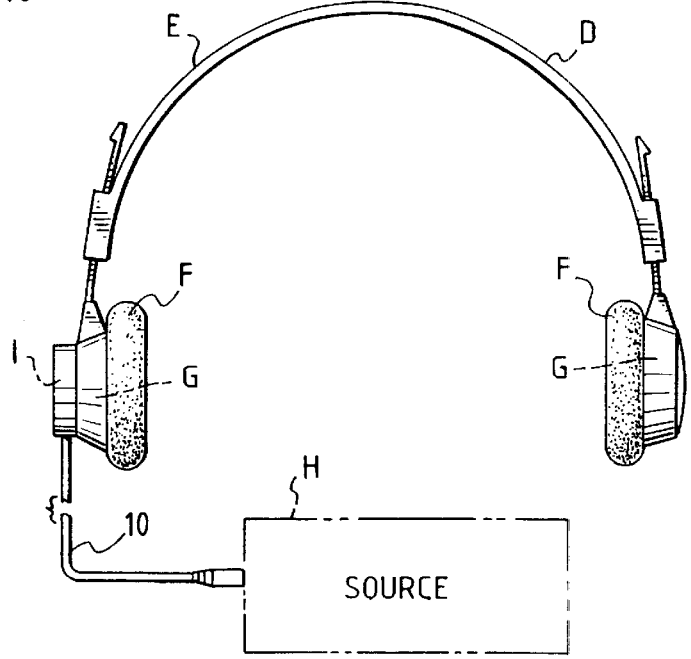
FIG. 6 is an elevational view of a headset and source unit.

Turning now to the drawings, FIG. 1 shows a conventional cellular telephone base unit A, ear piece B and microphone C. The cellular telephone base unit A is merely one example of a source unit. Other source units may include, for example, a tape recorder, compact disc player, or radio. Likewise, the ear piece B and microphone C are merely examples of remote devices. Other remote devices may include, for example, stereo headphones. The cord reel 1 of the invention is contained within the base unit A. A retractable cord 10 connects the source A to the remote devices B and C. Alternatively, depending on the physical configuration of the particular remote device, the cord reel could be carried by the remote device, the retractable cable providing the connection to the source. Indeed, the cord reel of the invention is sufficiently small to fit within conventional stereo headsets. FIG. 6 illustrates a cord reel 1 of the invention mounted in headset D. The headset has a head band E and at least one ear piece F. Ear piece F houses a speaker G. Retractable cord 10 connects speaker G to source H. Other applications for the cord reel of the invention will be apparent to those skilled in the art. The specific references herein to a cellular telephone and a headset are for illustration, not limitation.

Figure 2:
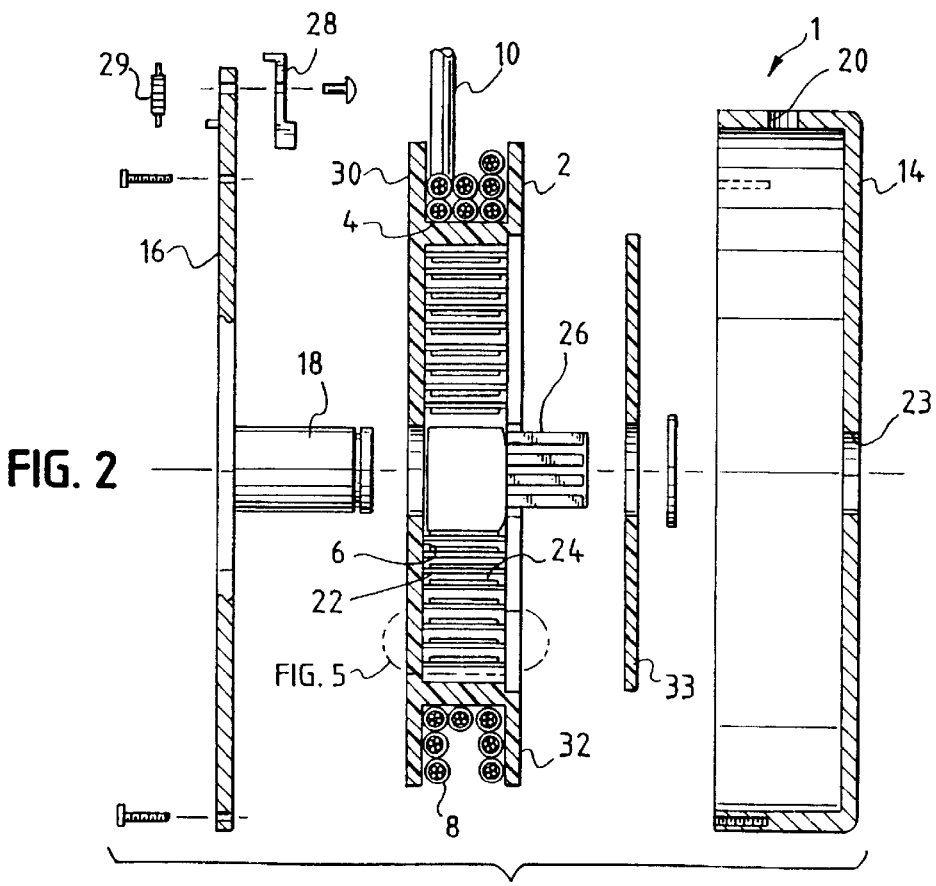
FIG. 2 is an exploded radial cross section through a preferred embodiment of the invention.
Figure 3:
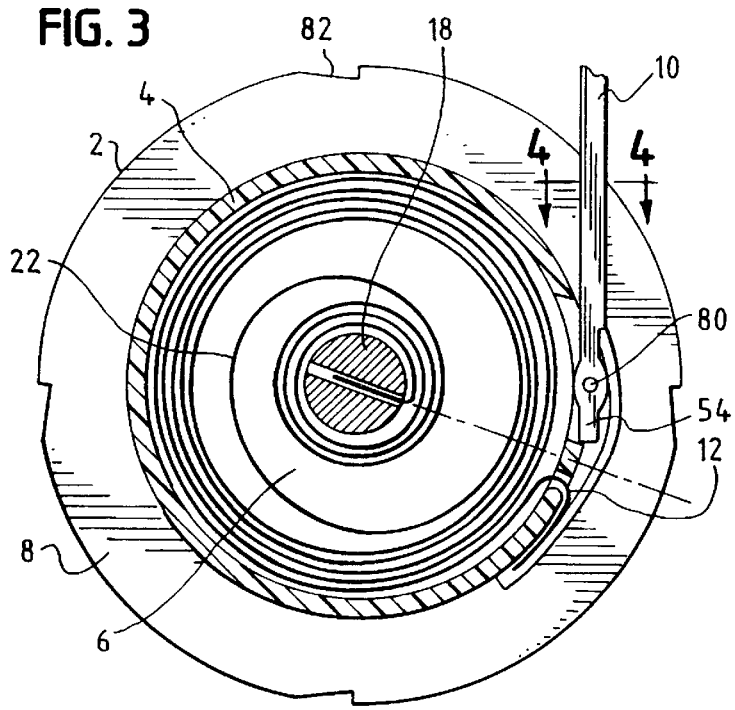
FIG. 3 is an axial cross section of the spool of the invention.

FIGS. 2 and 3 more specifically illustrate the cord reel 1 of the invention. The cord reel comprises a spool 2, retractable cord 10, and inner cable 24. The spool has an annular wall 4 defining an inner chamber 6 and an outer trough 8. Trough 8 may comprise a chamber, compartment, or other volume of space for storing retractable cable 10. Approximately one meter of cord may be held in trough 8. Trough 8 is shown as having side walls perpendicular to annular wall 4, but it may have other configurations. It is shown as being open at its radially outward end, but trough 8 may be partially or fully enclosed by a housing or the like. Opening 12 in annular wall 4 facilitates connection between inner chamber 6 and outer trough 8. Spool 2, further includes radial side walls 30 and 32. Alternatively, spool 2 may comprise spokes or the like along the sides of inner chamber 6 in lieu of side walls. A cover plate 33 is applied to cover the inner chamber 6 after installation of spring 22 and inner cable 24. The cover plate may be secured with a snap ring as illustrated, or preferably, may be attached by deforming a few adjacent points of the spool over the edges of the cover plate to permanently secure the plate onto the spool.

The cord reel 1 may preferably include a housing 14 and base plate 16. The housing and/or base plate may be part of the source or remote device in or onto which the cord reel of the invention is carried. An arbor 18 is attached to base plate 16. The arbor is a spindle, hub, axle or other device onto which the spool 2 may be rotatably mounted. Alternatively, the arbor may be attached to the housing. The specific configuration of the housing, base plate and arbor are not important, as long as the spool is rotatably. supported. Housing 14 has a radial opening 20 for passage of an end of retractable cord 10, and an axial opening 23 for passage of inner cord 24. Alternatively, inner cord 24 could exit the reel through an axial slot in the base plate 16. Another option is that the inner cord could terminate or exit at or near the central axis of the reel. It should be understood that another cord or conductor means may be used to connect the inner cable to the source. All of these alternatives as well as other alternatives that will be apparent to those skilled in the art are intended to be covered by the appended claims.

The cord reel of the invention includes means for rotating the spool 2 to retract cord 10. The cable retracting means may include any known rotating devices, including springs, hand cranks, motors and other means known in the art. A preferred spring 22 is shown. Spring 22 is held in inner chamber 6 and helically coiled about and attached to the arbor 18. Preferred spring 22 may be fabricated by known techniques from spring steel, although other metals or even polymeric materials may be used.

Inner cable 24 is helically coiled in inner chamber 6. In the preferred embodiment, the inner cable 24 is helically wound with spring 22. The inner cable may desirably be attached to the spring. Alternatively, it may be wound with spring 22, but not attached thereto. Inner cable 24 is conductively connected on one end to retractable cable 10 through passage 12, with a second end 26 exiting spool 2 in an axial direction within or adjacent arbor 18. A second end 26 of the inner cable connects to the source, as described above.

A conductive coating or plating for EMI-RFI shielding, preferably nickel plating, may be optionally applied to the spool and/or to the housing to shield the inner chamber 6. This shielding layer is conductively connected to spring 22 through arbor 18 and annular wall 4. Alternatively, the spool and/or housing and base plate may be fabricated from metal or other conductive material, thereby removing a need for a conductive coating or plating. EMI-RFI shielding is desirable for some applications, such as low voltage microphone signals. However other applications, such as the headset of FIG. 6, do not require shielding. It is intended that the invention as defined by the appended claims cover both shielded and non-shielded retractable cord reels.

A ratchet may be optionally provided to selectively restrain rotation of spool 2. The ratchet may comprise a pawl 28 pivotally mounted to base plate 16 and spring 29. Spool 2 is provided with notches 82. The spring 29 biases ratchet pawl 28 to engage notches 82 to selectively prevent rotation of spool 2 in a cord retracting direction. A release lever (not shown) is provided to disengage pawl 28 from notch 82 to allow the spring to rotate the spool in a cable retracting direction. The ratchet herein is merely one example of a suitable ratchet. Other ratchet mechanisms as are well known in the art may be employed. Furthermore, the ratchet, although desirable in most applications, is not strictly needed as the invention is operative without any ratchet.

Figure 4:
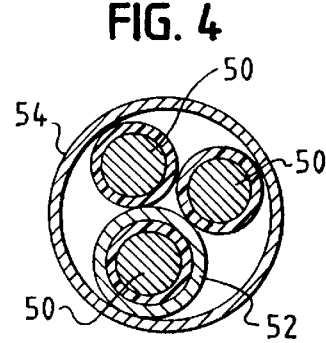
FIG. 4 is a cross section of one preferred retractable cord of the invention.

FIG. 4 is a cross section through retractable cord 10. Retractable cord 10 is preferably comprised of plural, individually insulated inner conductors 50. At least one of the conductors is preferably shielded by a conductive layer 52. An outer reinforcing layer 54 encloses the conductors. Shield layer 52 is preferably comprises a copper braid. Reinforcing layer 54 is preferably comprised of nylon braid for its excellent strength, relative small size, and light weight. Fabric braid layer 54 is preferably attached to the spool to limit stress/strain on the conductors, but in some applications it may not be necessary to attach the reinforcing layer to the spool. Attachment may be made in any manner, such as by mechanically attaching the braid to spool 2 with a pin 80, as shown in FIG. 3. Mechanical attachment may be made by pulling back an end portion of preferred nylon braid layer 54, heating it to fuse the braids together, and attaching the fused braids to spool pin 80. Alternatively, the braid may be attached to the spool with an adhesive. Alternatively a tail end of the fabric braid may be inserted into a hole in the spool and knotted to attach the braid layer to the spool. The opposite end of the braid is mechanically anchored to the remote device C. Layer 54 will carry the mechanical stress placed on cord 10 through use. Because fabric braid layer 54 provides a great deal of tensile strength in a relatively thin layer, cord 10 may thereby have a desirably small overall diameter, good flexibility, and yet have sufficient tensile strength to offer a prolonged service life.

Figure 5:
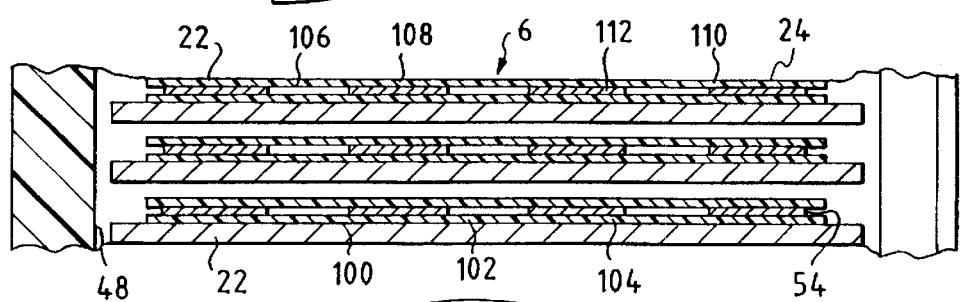
FIG. 5 is a cross section of a portion of one preferred spring and inner cable of the invention.

FIG. 5 is a cross section of a layered portion of spring 22 with inner cable 24 in inner chamber 6. As indicated above, FIG. 5 illustrates an example of a preferred inner cable and spring, but other configurations will be apparent and all such configurations are intended to be covered within the scope of the invention, as defined by the appended claims. A preferred inner cable 24 comprises a lower insulating layer 100 adjacent spring 22, a plurality of intermediate conductors 102, and an overlying insulating layer 104. Although insulating layer 104 is illustrated as overlying conductors 102, it may alternately be underlying spring 22, it being important only that the signal conductors be insulated from spring 22. Individual conductors 102 may be attached to insulating layers 100 and 104 by an adhesive, with underlying layer 100 likewise affixed to spring 22 by an adhesive. Other means of attachment may comprise heat bonding. Alternatively, conductive strips may be painted or printed to the spring.

Alternatively, inner cable 24 may comprise a flat ribbon cable adhered to or separate from the spring, or individually insulated conductors affixed to or integral with spring 22. Other alternatives will be apparent to those skilled in the art, including, a spring comprised of a non-conducting polymer with an elastic memory for spring like resiliency, with inner cable 24 comprising individual conductors electroplated or otherwise deposited thereupon. A metal spring, however, is preferred as polymer springs have been found to disadvantageously lose their elastic memory at a much faster rate than the preferred metal spring.

Inner cable 24 passes through the spool annular wall opening 12 and is conductively connected to retractable cord conductors 50. Conductive connection may occur by splicing, by terminal connection, or by other means as may be known in the art. Alternatively, the conductors of retractable cord 10 may be unitary with the conductors of inner cable 24. At the attachment point adjacent annular wall opening 12, some slack is desirably provided in the conductors to provide for strain relief, so that when retractable cord 10 is pulled or otherwise stressed mechanical loads are carried by fabric braid layer 54 and not by conductors 50. This helps to prevent failure of conductors 50, and allows for a relatively small gage conductors 50 to be used so that retractable cable 10 may desirably be small, lightweight, and flexible.

It should be understood that although the retractable cord and inner cable are shown and described as having ends and as being spliced together, that retractable cord 10 and inner cable 24 may be a unitary cord. Accordingly, the term "retractable cord" shall mean the portion of the cable that is retractable, and the term "inner cable" shall mean the portion of the cord in inner chamber 6. Indeed, in some applications it may be acceptable or even desirable to have a flat, ribbon retractable cord, in which case, the inner cable portion 24 and retractable cord portion 10 may be portions of a continuous, unitary cable. It may also be feasible to fabricate a unitary cord that includes a flat portion (desirable as the inner cable) and a round portion (desirable at the retractable cord). These and other variations as may be apparent to those skilled in the art are intended to be covered by the appended claims.

To further improve performance of the conductors of the present invention with respect to freedom from electromagnetic interference, the plural conductors 102 of preferred inner cable 24 of the invention comprises at least one shield conductor. In reference to the cellular telephone example, two conductors are required for the ear piece and one for the microphone. The inner cable shown in FIG. 5 is comprised of four conductors. The left two 106 and 108 may used for the ear piece signals, and the right most conductor 110 for the microphone. In between is a shield conductor 112. The low output microphone signal carried by conductor 110 is thus shielded on the left by shield conductor 112, above and below by spring 22 and at the right by cover plate 33 or by other shielding carried by the spool or housing. Shield conductor 112 is conductively connected to spring 22, spool shield layer 48, and retractable cord shield 52 thereby providing a continuous, common shield. For applications that do not require shielding, such as the headset of FIG. 6, a shield conductor 112 is not required.

Although four individual conductors 102 are shown in FIG. 4, the present invention may comprise any number of conductors as may be required by a particular application. Also, as discussed infra, other configurations of conductors 102, insulation layers 104 and 100, and spring 22. are within the scope of the present invention.

By winding the inner cable 24 with spring 22, the present invention solves several problems of the prior art. First, valuable space is saved as the thin inner cable is contained in the same chamber as spring 22; no separate chamber is required. If as is preferred, the conductors 102 and insulation layers 100 and 104 are supported by spring 22, they may be very thin and flexible without risking high rates of failure. This provides additional space savings. Further, the conductors 102 are in an environment of excellent EMI-RFI shielding without requiring individual shielding. Specifically, conductor 110 is shielded from EMI-RFI from above and below by metallic spring 22, on one side by shield conductor 112 and on the other side by cover plate 33 and/or by spool wall nickel plating layers. Additional space savings are thus realized as the individual conductors 102 do not require individual shielding.

The advantages of the disclosed invention are thus attained in an economical, practical, and facile manner. While preferred embodiments and example configurations have been shown and described, it is to be understood that various further modifications and additional configurations will be apparent to those skilled in the art. It is intended that the specific embodiments and configurations herein disclosed are illustrative of the preferred and best modes for practicing the invention, and should not be interpreted as limitations on the scope of the invention as defined by the appended claims.

What is claimed is:

1. A retractable cord reel rotatable on an arbor, comprising:
    a) a spool, rotatably mounted on the arbor, said spool having an annular wall defining an outer trough and an inner chamber;
    b) a retractable cord removably held in said outer trough, said retractable cord having plural conductors and an outer reinforcing layer;
    c) an inner cable having a plurality of conductors, said inner cable being held in said spool inner chamber; and
    d) means attached to said spool for rotating said spool in a cord retracting direction, wherein the means for rotating comprises a spring in said inner spool chamber, and said inner cable is flat, said spring and said inner cable being mechanically detached from one another for at least a substantial portion of the length of said spring, said inner cable being helically co-wound with said spring, said spring having one end attached to the arbor and the other end attached to said spool.

2. A retractable cord reel rotatable on an arbor, comprising:
    a) a spool, rotatably mounted on the arbor, said spool having an annular wall defining a radially aligned outer trough and inner chamber;
    b) a retractable cord removably held in said outer trough;
    c) a spring coiled in said spool inner chamber, one end of said spring attached to the arbor and the other end of said spring attached to said spool, said spring for rotating said spool in a cord retracting direction; and
    d) an inner cable in said spool inner chamber, said inner cable comprising a flat, ribbon cable, said inner cable being mechanically detached from said spring for at least a substantial portion of the length of said spring, said inner cable helically co-wound with said spring, said inner cable being electrically connected to said retractable cord.

3. A retractable cord reel as in claim 2, wherein said spool is electromagnetically shielded.

4. A retractable cord reel as in claim 2, the cord reel electrically connecting a source to a remote device, a portion of said inner cable extending axially out of the reel at the arbor for connection to the source, said retractable cord being connected to the remote device.

5. A retractable cord reel as in claim 2, further comprising a housing for containing said spool, said housing having a radial opening through which said retractable cord passes.

6. A retractable cord reel as in claim 2, further comprising a ratchet operatively engaged with said spool for selectively restraining rotation of said spool.

7. A retractable cord reel as in claim 2, wherein said retractable cord and said inner cable are unitary.

8. A retractable cord reel as in claim 2, wherein said retractable cord comprises an outer jacket and at least one inner conductor, said outer jacket mechanically anchored to said spool.

9. A retractable cord reel as in claim 2, wherein said retractable cord comprises plural conductors and a shield layer surrounding at least one of said conductors; said inner cable comprises plural conductors, each connected to a respective one of said retractable cord conductors, and a shield conductor connected to said retractable cord shield layer; and further comprising an shield substantially surrounding said spool inner chamber, said inner chamber shield, spring, shield conductor and shield layer being electrically connected to each other.

10. A retractable cord reel as in claim 2, wherein said inner cable comprises a substantially flat ribbon cable.

11. A retractable cord reel as in claim 2, wherein said inner cable is bonded to said spring.

12. A retractable cord reel as in claim 2, wherein said inner cable comprises at least one conductive strip carried on said spring.

13. A retractable cord reel as in claim 2, wherein said spool having a diameter of less than approximately 4 cm and having a thickness of less than approximately 2 cm.

14. A retractable cord reel, comprising:
    a) a housing having a substantially cylindrical interior, a radial opening, and an axial opening;
    b) an arbor in said housing;
    c) a spool mounted for rotation on said arbor, said spool having an annular wall defining and outer trough and an inner chamber, said annular wall having a radial opening therein;

d) an electromagnetic shield surrounding said spool;
e) a retractable cord removably wrapped in said trough, said cord comprising a plurality of conductors, said conductors having a first end adjacent said opening in said spool annular wall, a shield layer over at least one of said conductors, one end of said shield layer conductively connected to said spool shield, and a reinforcing member, a first end of said reinforcing member anchored to said spool;
f) a spring in said spool inner chamber, said spring having one end attached to said arbor and another end attached to said spool; and
g) an inner cable in said spool inner chamber helically wound with said spring, wherein said inner cable is mechanically detached from the spring.

15. A retractable cord reel for making a plural signal connection between a source and a remote device, comprising:
a) a housing having a radial opening and an axial opening;
b) an arbor in said housing;
c) a spool mounted for rotation on said arbor, said spool having an annular wall defining an outer trough and an inner chamber, said annular wall having a radial opening connecting said inner chamber and said outer trough;
d) a spring in said spool inner chamber, one end of said spring attached to said arbor and a second end attached to said spool;
e) a substantially flat inner cable in said spool inner chamber helically wound with said spring and mechanically detached from said spring, said inner cable having one end extending to said opening in said annular wall and a second end exiting said housing axial opening, said second end connected to one of said source or remote device, said inner cable having plural signal conductors, and a shield conductor between said plural signal conductors;
f) an electromagnetic shield surrounding at least said spool inner chamber and electrically connected to said spring and said inner cable shield conductor;
g) a retractable cord removably wrapped in said spool trough, said cord having a first end adjacent said opening in said spool annular wall, and a second end extending through said radial opening in said housing, said second end connected to the other of the source or remote device, said retractable cord comprising plural signal conductors, each of said cord conductors electrically connected to a respective one of said inner cable conductors, a shield layer surrounding at least one of said retractable cord conductors, a first end of said cord shield layer electrically connected to said inner cable shield conductor, and a fabric braid layer over said conductors, a first end anchored to said spool and a second end anchored to said other of the source or remote device.

16. A retractable cord reel within a housing, comprising:
a) a spool rotatably mounted in the housing, said spool having an outer compartment and an inner compartment, said outer and inner compartments being radially aligned;
b) a retractable cord removably held in said outer compartment of said spool;
c) an inner cable helically wound in said inner compartment of said spool, said inner cable connected to said retractable cord; and d) means for rotating said spool in a cord retracting direction, said means for rotating said spool being helically wound with and mechanically detached from said inner cable.

17. A combination headset and retractable cord reel, comprising
a) a headset having a head band and at least one ear piece and a speaker in said ear piece;
b) a spool rotatably mounted to said headset, said spool having an outer trough and an inner chamber;
c) a cord wound in the trough of said spool, one end of said cord being retractable from said spool and said headset;
d) a helical spring in said inner chamber, said spring for rotating said spool in a cord retracting direction; and
e) an inner cable, at least a portion of said inner cable helically wound with said spring in the inner chamber of said spool, one end of said inner cable being connected to the speaker in said headset and the other end of said inner cable being connected to the other end of said retractable cord.

18. A combination headset and retractable cord reel as in claim 17, wherein said spool has a diameter of less than about 4 cm.

19. A combination hand held communication device and retractable cord reel, comprising:
a hand held communication device having a housing;
b) at least one of an earpiece and a microphone;
c) a spool rotatably mounted within said communication device housing, said spool having an outer trough and an inner chamber;
d) a cord wound in the trough of said spool, one end of said cord being retractable from said spool and said communication device housing, said one end being connected to at least one of an earpiece and a microphone;
e) means for rotating said spool in a cord retracting direction; and
f) an inner cable in the inner chamber of said spool, one end of said inner cable being connected to said communication device.

20. A combination hand held electronic device and retractable cord reel, comprising:
a) a hand held electronic device having a housing;
b) a spool rotatably mounted within said electronic device housing, said spool having an outer trough and an inner chamber;
c) a cord wound in the trough of said spool, one end of said cord being retractable from said spool and said electronic device housing;
d) means for rotating said spool in a cord retracting direction, wherein the rotating means includes a spring; and
e) an inner cable in the inner chamber of said spool, wherein the inner cable is helically wound with the spring and mechanically detached from the spring for at least a substantial portion of the length of the spring, one end of said inner cable being connected to said electronic device and the other end of said inner cable being connected to the other end of said retractable cord.

* * * * *